United States Patent
Bu et al.

(10) Patent No.: US 8,051,479 B1
(45) Date of Patent: *Nov. 1, 2011

(54) METHOD AND APPARATUS FOR DETECTING SHELLCODE

(75) Inventors: Zheng Bu, Irvine, CA (US); Fengmin Gong, Livermore, CA (US)

(73) Assignee: McAfee, Inc., Santa Clara, CA (US)

( * ) Notice: Subject to any disclaimer, the term of this patent is extended or adjusted under 35 U.S.C. 154(b) by 1279 days.

This patent is subject to a terminal disclaimer.

(21) Appl. No.: 11/332,115

(22) Filed: Jan. 12, 2006

Related U.S. Application Data

(63) Continuation of application No. 10/172,138, filed on Jun. 13, 2002, now Pat. No. 7,904,955.

(51) Int. Cl.
G06F 12/14 (2006.01)
G06F 12/16 (2006.01)
G08B 23/00 (2006.01)

(52) U.S. Cl. .................................................. 726/22

(58) Field of Classification Search ............... 713/179, 713/182, 190, 193
See application file for complete search history.

(56) References Cited

U.S. PATENT DOCUMENTS

| | | | |
|---|---|---|---|
| 5,557,742 A | 9/1996 | Smaha et al. | |
| 5,621,889 A | 4/1997 | Lermuzeaux et al. | |
| 5,769,942 A | 6/1998 | Maeda | |
| 5,798,706 A | 8/1998 | Kraemer et al. | |
| 5,805,801 A | 9/1998 | Holloway et al. | |
| 5,812,763 A | 9/1998 | Teng | |
| 5,864,683 A | 1/1999 | Boebert et al. | |
| 5,892,903 A | 4/1999 | Klaus | |
| 5,898,830 A | 4/1999 | Wesinger, Jr. et al. | |
| 5,905,859 A | 5/1999 | Holloway et al. | |
| 5,919,257 A | 7/1999 | Trostle | |
| 5,919,258 A | 7/1999 | Kayashima et al. | |
| 5,940,591 A | 8/1999 | Boyle et al. | |
| 6,052,788 A | 4/2000 | Wesinger, Jr. et al. | |
| 6,088,804 A | 7/2000 | Hill et al. | |
| 6,119,236 A | 9/2000 | Shipley | |
| 6,154,844 A | 11/2000 | Touboul et al. | |
| 6,178,509 B1 | 1/2001 | Nardone et al. | |
| 6,185,678 B1 | 2/2001 | Arbaugh et al. | |
| 6,185,689 B1 | 2/2001 | Todd, Sr. et al. | |
| 6,243,815 B1 | 6/2001 | Antur et al. | |
| 6,301,699 B1 * | 10/2001 | Hollander et al. | 717/131 |
| 6,513,122 B1 | 1/2003 | Magdych et al. | |
| 7,007,301 B2 | 2/2006 | Crosbie et al. | |
| 7,409,717 B1 * | 8/2008 | Szor | 726/24 |

(Continued)

OTHER PUBLICATIONS

U.S. Appl. No. 11/450,110, filed Jun. 9, 2006.

(Continued)

*Primary Examiner* — Benjamin Lanier
(74) *Attorney, Agent, or Firm* — Wong, Cabello, Lutsch, Rutherford & Brucculeri, L.L.P.

(57) ABSTRACT

The invention is a method and apparatus for detecting shellcode such that a set of computer instructions is scanned for the presence of a null operation instruction. The computer instructions are also examined for the presence of a system call instruction, and reviewed for the presence of a decoder instruction set. A null operation weight value is then determined corresponding to the null operation instruction. Also assessed is a system call weight value corresponding to the system call instruction. In addition, a decoder weight value is calculated corresponding to the decoder instruction set. The null operation weight value, the system call weight value, and the decoder weight value are then analyzed to identify a shellcode.

25 Claims, 7 Drawing Sheets

U.S. PATENT DOCUMENTS

| | | |
|---|---|---|
| 7,904,955 B1 | 3/2011 | Bu et al. |
| 2006/0069912 A1 | 3/2006 | Zheng et al. |

OTHER PUBLICATIONS

Office Action Summary from U.S. Appl. No. 10/172,138 mailed on Aug. 11, 2009.

Office Action Seminary from U.S. Appl. No. 10/172,138 mailed on Jan. 25, 2010.

Final Office Action Summary from U.S. Appl. No. 10/172,138 mailed on May 21, 2010.

Notice of Allowance from U.S. Appl. No. 10/172,138, dated Nov. 4, 2010.

Giovanni Vigna, et al., "NetSTAT: A Network-Based Intrusion Detection System," Department of Computer Science, University of California Santa Barbara, pp. 1-46. Supported under Agreement No. F30602-97-1-0207, 1999.

Y. F. Jou, et al., and S.F. Wu, et al., "Design and Implementation of a Scalable Intrusion Detection System for the Protection of Network Infrastructure," Advanced Networking Research, MCNC, RTP, NC, et al., pp. 15, 2000.

Ivan Krsul, "Computer Vulnerability Analysis Thesis Proposal," The COAST Laboratory, Department of Computer Sciences, Purdue University, IN, Technical Report CSD-TR-97-026. Apr. 15, 1997, pp. 1-23.

Matt Bishop, "Vulnerabilities Analysis," Department of Computer Science, University of California at Davis, pp. 1-12.

Matt Bishop, "A Taxonomy of UNIX System and Network Vulnerabilities," CSE-95-10, May 1995, pp. 17.

Matt Bishop, et al., "A Critical Analysis of Vulnerability Taxonomies," CSE-96-11, Sep. 1996, pp. 1-14.

Dawn X. Song, et al., "Advanced and Authenticated Marking Schemes for IP Traceback," Report No. UCB/CSD-00-II07, Computer Science Division (EECS), University of California, Berkeley, Jun. 2000, pp. 1-11.

Chien-Lung Wu, et al., IPSec/PHIL (Packet Header Information List): Design, Implementation, and Evaluation, NC State University, Raleigh, NC, et al., pp. 6, 2002.

Allison Mankin, et al., "On Design and Evaluation of "IntentionDriven" ICMP Traceback," USC/ISI, et al., pp. 7, 2002.

Brian Carrier, et al., "A Recursive Session Token Protocol for Use in Computer Forensic and TCP Traceback," CERIAS, Purdue University, West Lafayette, IN, et al., 2002 IEEE, pp. 7.

Stefan Savage, et al., "Practical Network Support for IP Traceback," Department of Computer Science and Engineering, University of Washington, Seattle, WA. Copyright 2000, pp. 12.

Diheng Qu, et al., "Statistical Anomaly Detection for Link-State Routing Protocols," Computer Science Department, North Carolina State University, Raleigh, NC, et al., Supported under Contract No. F30602-96-C-0325,pp. 9, 2002.

Office Action Summary from U.S. Appl. No. 11/450,110 mailed on Jan. 6, 2010.

Office Action Summary from U.S. Appl. No. 11/450,110 mailed on Jul. 8, 2010.

Office Action Summary from U.S. Appl. No. 11/450,110 mailed on Sep. 23, 2010.

* cited by examiner

METHOD AND APPARATUS FOR DETECTING SHELLCODE

This is a Continuation application of prior application Ser. No. 10/172,138 filed on Jun. 13, 2002, now U.S. Pat. No. 7,904,955 the disclosure of which is incorporated herein by reference.

BRIEF DESCRIPTION OF THE INVENTION

This invention relates generally to computer network security. More specifically, this invention relates to a method and apparatus for detecting shellcode programs.

BACKGROUND OF THE INVENTION

Recent history has seen a proliferation of shellcode attacks against computers. These attacks seek to exploit a relatively recently discovered vulnerability in many modern computers. This susceptibility, often called buffer overflow vulnerability, provides a previously unknown backdoor of sorts through which a malicious program can be inserted and executed. In essence, certain fields within the memory stacks of modern computers are designed to accept, or at least expect to typically receive, only American Standard Code for Information Interchange (ASCII) or other information strings, and not executable code. The buffer overflow vulnerability, then, is simply a reference to the fact that malicious executable code cleverly designed to look like an ASCII string can be placed into such a field. If this code is subsequently executed, it will often wreak significant havoc on the target computer. Examples of such susceptible fields are buffers, or allocated memory spaces, intended to hold character strings such as usernames, passwords, login names, and the like.

Fields such as these typically serve as a general mechanism for passing parameters to subroutines or functions when they are invoked. They also can provide temporary memory storage for any other variables such subroutines may require during execution, and are typically allocated using a memory stack or heap structure. The vulnerability in this configuration rests in the fact that the instruction pointer register, holding the return address to the calling function, is saved sequentially within the same memory area, coupled with the fact that certain subroutines have implemented the ability to write strings to the buffers without length-checking. In other words, prior to writing an input string to a buffer, some subroutines do not check the length of the string against the allocated size of the buffer. When it gets written then, a sufficiently long string will simply overflow the buffer and write information into its corresponding instruction pointer register. If the string is carefully designed, it can place a memory address into the instruction register, directing the computer to skip to that address and look for instructions to execute.

Herein lies the problem. Cleverly-designed programs have been written as strings containing ASCII characters that double as executable code, often called shellcode. These strings also place an address in the instruction register designed such that the address points back into the buffer. The target computer is thus directed to run this executable code instead of jumping to instructions for its normal processing task.

This shellcode gets its name from one of the most common programs for exploiting this vulnerability. The program is designed to spawn an instruction shell on the target computer, hence the name shellcode. These instruction shells, typically simplified programming environments that allow users to manipulate files or execute other system-level commands, are then used in a number of detrimental ways. For example, instructions can be issued to carry out such tasks as deleting files, changing passwords, sending information such as access codes to the hacker's computer, or even downloading a different virus program and executing it.

One of the best methods of avoiding shellcode attacks, or attempts to place shellcode into a target computer such that it will be executed, is to detect the shellcode and remove it before its execution. It would thus be desirable to provide a method and apparatus for detecting shellcode.

Unfortunately, shellcodes can be made difficult to detect. Shellcode can be written in many different ways, utilizing different commands and methods, so as to avoid any single characteristic set of instructions. It would thus also be highly desirable to provide a method for detecting shellcode that scans for the existence of a plurality of such characteristic instruction sets.

Finally, even though the exact form of a shellcode can be disguised, it must carry out at least a certain set of operations in order to perform its appointed task. For example, shellcodes must always execute certain tasks, such as manipulating information by transferring arguments from one place to another, regardless of the exact commands, instruction language, and the like that are used. It would thus be further desirable to provide a function-based method for detecting shellcode that examines the operations or tasks that a string is written to execute, rather than simply searching for specific instructions.

SUMMARY OF THE INVENTION

The invention is a method and apparatus for detecting shellcode such that a set of computer instructions is scanned for the presence of a null operation instruction. The computer instructions are also examined for the presence of a system call instruction, and reviewed for the presence of a decoder instruction set. A null operation weight value is then determined corresponding to the null operation instruction. Also assessed is a system call weight value corresponding to the system call instruction. In addition, a decoder weight value is calculated corresponding to the decoder instruction set. The null operation weight value, the system call weight value, and the decoder weight value are then analyzed to identify a shellcode.

The invention is advantageous for its ability to detect shellcode both by its form and by its function. Regardless of the exact sequence of instructions used, certain operations and/or instruction sets are required in even a minimally functional shellcode. Thus, by scanning for both shellcode instructions and characteristic shellcode operations, the invention can more accurately detect shellcode.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

The present invention is directed toward an apparatus and method for detecting shellcode in a number of different ways. In one embodiment, an input string is scanned for the presence of various indicia typical of shellcodes. The input string is also scanned for the presence of instructions designed to carry out specific types of operations, such as instructions to manipulate data, that do not exist in ordinary strings of text and yet are required by most shellcodes to accomplish their goals. For example, a common character string such as a username, password, or address usually contains only printable ASCII characters. The presence of instructions for manipulating data, such as push, pop, or mov instructions, should thus be cause for alarm, as they are also required by most shellcodes to accomplish their goals. This additional function-based approach, which scans for the presence of operations that should not exist in most text strings but that are required by most functional shellcodes, thus is capable of detecting shellcode with increased accuracy.

Figure 1:
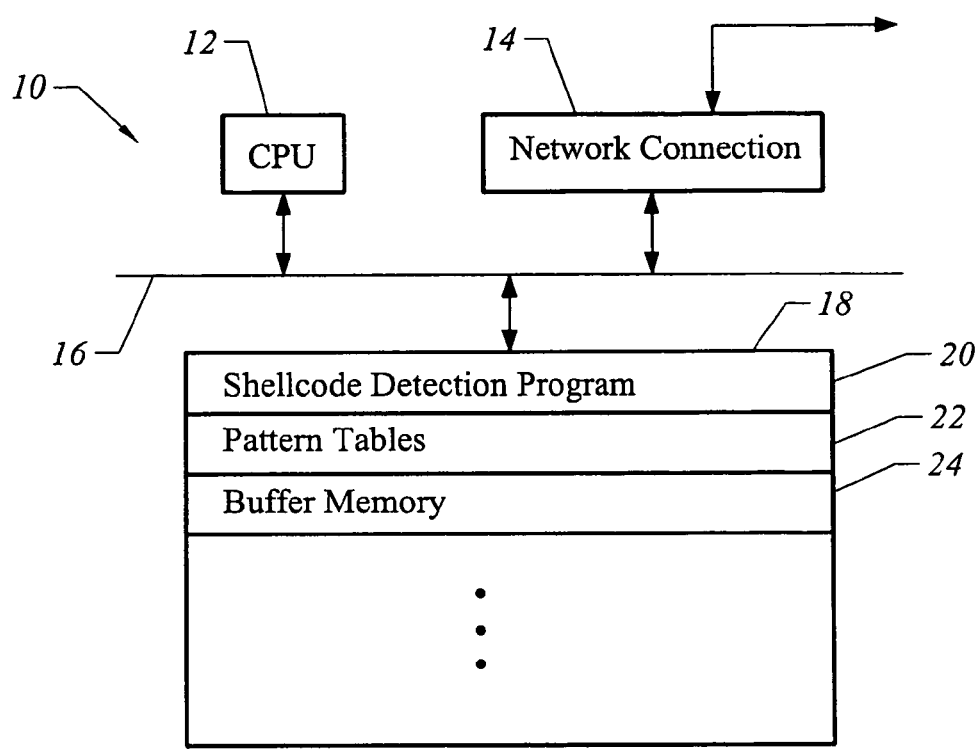
FIG. 1 illustrates a general-purpose computer configured to operate in accordance with an embodiment of the present invention.

FIG. 1 illustrates a networked computer 10 designed in accordance with one embodiment of the invention. The computer 10 includes a central processing unit (CPU) 12 that executes instructions to carry out the invention, and a network connection 14 for transferring data over a network. The CPU 12 and network connection 14 communicate over a bus 16, which also connects to a memory (primary and/or secondary memory) 18 that stores instructions to carry out the various steps of the invention. The memory 18 in turn stores a shellcode detection program 20 for detecting shellcode, pattern tables 22 storing instruction patterns typical to most shellcodes, and a buffer memory 24. As an example, a tangible computer readable medium may include the memory 18.

In operation, shellcodes are typically transmitted to the computer 10 via the network connection 14, where they are placed in the buffer memory 24. The buffer memory 24 thus includes memory allocated for both buffers and instruction registers. The shellcode detection program 20 scans the strings in the buffer memory 24, examines these strings for the presence of any patterns stored in the pattern tables 22, and determines the presence or absence of a shellcode accordingly.

Figure 2:
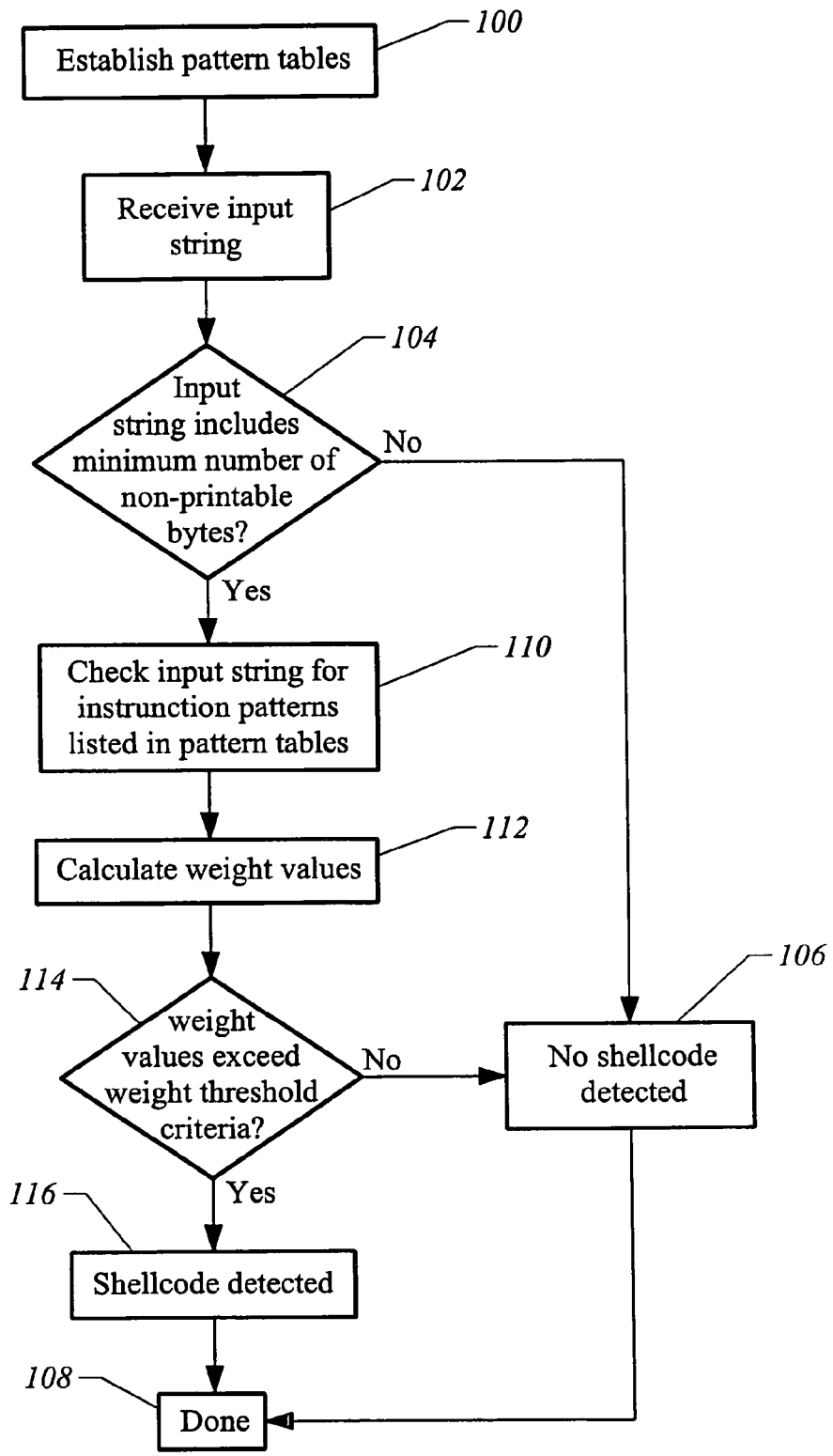
FIG. 2 illustrates processing steps performed in accordance with an embodiment of the present invention.

FIG. 2 illustrates various processing steps performed by the computer 10 in accordance with an embodiment of the invention. Pattern tables are first established containing a number of instruction patterns common to many shellcodes (step 100). For example, a common pattern within shellcodes is a series of push instructions for moving arguments onto the stack, followed by a call instruction executing a system function that requires these arguments. An effective set of pattern tables would thus contain a number of patterns such as this, written for a number of different computer architectures.

Once the pattern tables are established and the computer 10 receives an input string within its buffer memory 24 (step 102), the shellcode detection program 20 scans the string to determine whether or not it is a shellcode. First, a check is made to determine whether the string includes more than a minimum number of non-printable bytes (step 104). Input strings are typically text strings, and as a result all their bytes should comprise printable characters. Instructions, on the other hand, are often non-textual and thus non-printable. Step 104 thus essentially checks to determine whether at least some instructions are present. If not, then the text string cannot be a shellcode (step 106), and the detection process terminates (step 108).

Because many shellcodes contain at least some non-printable bytes as instructions, step 104 provides a quick and efficient criterion by which to determine that an input string is not a shellcode. By performing step 104, embodiments of the invention thus can avoid wasting resources performing a more in-depth analysis of strings that clearly cannot be shellcodes. However, it is also possible to write shellcodes containing no non-printable characters. Thus, for increased accuracy, the invention should be construed to include detection processes that do not perform a check for non-printable bytes.

Regardless of the presence of step 104, the shellcode detection program 20 checks the input string for the presence of any instruction patterns listed in the pattern tables 22 (step 110). The patterns within the pattern tables 22 are divided into a plurality of categories, each corresponding to a different shellcode characteristic or trait. For example, the system calls mentioned above would fall into one category, while information manipulation instructions such as push and pop would be placed in a separate category. This aspect of the invention simply discloses the categorization of shellcode traits, and thus includes an arbitrary number of such categories, defined and organized in an arbitrary fashion.

Once the number of matches within each category is determined from step 110, a weight value is calculated for each category (step 112). These weight values are expressions of the number of times a pattern from a particular category matches the text string. Threshold criteria are established for each weight value or combination of weight values, and the values are then compared against these thresholds (step 114). If the weight values exceed these criteria, the text string is deemed to be a shellcode (step 116), and the process terminates at step 108. Conversely, if the weight values do not exceed these criteria, the process jumps to step 106 where the text string is deemed not to be a shellcode.

Figure 3A:
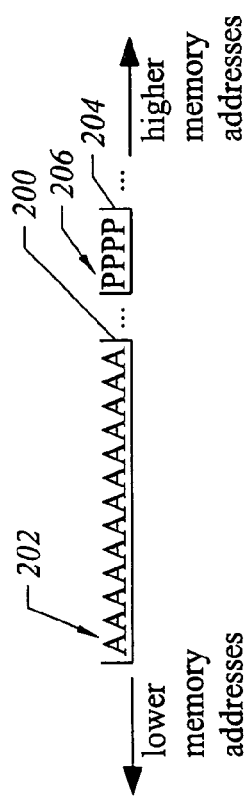
FIG. 3A illustrates computer buffer memory as utilized by a general-purpose computer in accordance with an embodiment of the present invention.

A more precise understanding of the processing steps of FIG. 2 is achieved by first explaining the operation of a typical shellcode. FIG. 3A illustrates a standard computer buffer 200 located within the buffer memory 24. In typical operation, the buffer 200 stores an ASCII string 202, which could be a password or some other form of miscellaneous data. An instruction register 204 is associated with the buffer 200 and usually holds an instruction pointer 206 for directing the CPU 12 to the address of an instruction set used to process the contents of the buffer 200.

Figure 3B:
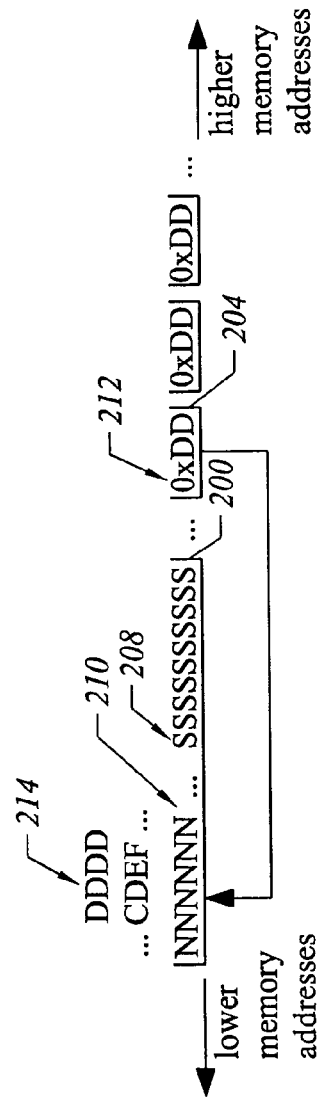
FIG. 3B illustrates shellcode-containing computer buffer memory as utilized by a general-purpose computer in accordance with an embodiment of the present invention.

FIG. 3B illustrates the same buffer 200 with a shellcode 208 placed within it. The complete input string typically includes a number of null operation instructions (NOPs) 210 or their functional equivalent, followed by the shellcode 208 itself, followed by a number of return addresses 212. In operation, the complete input string is placed in the buffer using a command without bounds checking, such as the strcpy command in C. This allows strings longer than the buffer to overflow into adjacent memory such as the instruction register 204, which saves the address of the next instruction the CPU should execute. Once this occurs, a correctly chosen return address 212 will direct the computer to a location within the buffer 200, where it will begin executing shellcode commands. Here, for instance, the return address 212 directs the computer to hexadecimal memory address 0xDD 214, where the computer begins to execute instructions.

Because the starting address of the buffer 200 often cannot be known beforehand by an outside user, NOPs, or any equivalent operation whose execution does not affect the shellcode's intended operation, are used to provide some leeway. Commonly, NOPs 210 are placed in the buffer 200 preceding the shellcode 208. The memory address 214 can then be chosen somewhat indiscriminately and so long as the address 214 points to somewhere within the NOP 210 field, the CPU 12 will simply begin executing these superfluous operations until it reaches, and begins executing, the shellcode 208.

While FIGS. 3A, 3B make reference to specific NOP strings 210 and shellcode strings 208, attention now turns to more general aspects of null operations and shellcodes. As a result, specific reference numbers will no longer be used in connection with these quantities. Viewed in this more generic sense, FIGS. 3A, 3B not only illustrate basic aspects of shellcode form and operation, but also explain the presence of one important shellcode characteristic: the presence of NOPs or other similar instructions. It is thus clear that the presence of these instructions in an input string is one characteristic that can be utilized to detect shellcode. Attention now turns to a more detailed description of shellcode form and function, which serves to illustrate other such characteristics.

In one sense, a shellcode is typically simply a command to open an instruction shell. That is, the shellcode comprises simply the machine-code language instructions for carrying out the "/bin/sh" command or its equivalent. Viewed in this light, many shellcodes are relatively straightforward, essentially including two components: 1) a pointer to the memory location of the null terminated string "/bin/sh", and 2) a call to a library command such as execve, which executes the application program identified by the null terminated string.

The first of these components includes a series of data manipulation instructions for moving arguments into the memory locations or registers required by the library command. For example, in some operating systems, arguments of function calls, e.g. the address of the null terminated string, must be pushed onto the stack. This is usually accomplished by an assembly language push instruction. The address of the null terminated string must then be moved onto the EAX (or a differently-named instruction pointer register, depending on the operating platform) register (using mov or an equivalent instruction), in preparation for the system call.

The second component includes a call to the library command, which functions by invoking underlying operating system services. These services are implemented in kernel code and are available to user programs via system call instructions. Shellcodes thus typically contain a call to the library command (via a call instruction or its equivalent in another operating system, such as the "ta 8" trap instruction or "int 80" instruction), followed by the actual instructions of the library command as appended by the assembler. These commonly include instructions to save the old frame pointer address and move the pointer again, instructions to pop the string address off the top of the stack (an assembly pop instruction), and a switch to kernel mode for actual execution of the "/bin/sh" string.

As the address of the "/bin/sh" string is difficult to predict, the second component commonly includes an additional call instruction followed by the string itself. A jump instruction is then included at the beginning of the shellcode, instructing the CPU 12 to jump to the call instruction, which then automatically pushes the string's address onto the stack when it stores its own return address. However, shellcodes do not universally implement this extra call instruction, as some operating systems provide a get address instruction to retrieve the address of the current stack. It will be seen below that the methods of the various embodiments of the invention are able to detect both shellcodes that include this additional call instruction and those that do not.

One variation employed by some shellcodes in order to avoid detection is the use of a decoder. Typical shellcodes work by containing the actual "/bin/sh" string along with assembly language instructions for its execution. The CPU 12 is then instructed to execute these instructions instead of executing regular stack instructions. In contrast, shellcodes utilizing decoders are not executed directly, but instead contain encoded instructions for executing a shell. These instructions are then decoded and placed in the stack, where the CPU 12 executes them in the same manner it would execute any other instructions. Since the instructions as placed in the buffer 200 are encoded and only appear in their conventional form (i.e., a series of instructions such as push, pop, mov, and call) within the stack, these types of shellcode are difficult to detect. However, even decoders exhibit certain characteristics based on their function. For instance, by their very nature, decoders must often contain a number of instructions such as push and mov for shifting instructions onto the stack, as well as jump instructions to instruct the CPU 12 to skip to the appropriate stack address and begin executing shellcode.

It should be noted that the execve command is but one expression of a platform-dependent instruction to open a shell. As such, the invention clearly includes methods for detecting not simply this command, but rather includes methods for detecting shellcode instructions on any platform, regardless of their exact syntax. It should also be noted that shellcodes for spawning instruction shells are but one form of shellcode. As mentioned earlier, shellcodes exist for performing a number of other tasks, such as breaking "chroot" or other security protocols to allow root/superuser access, listening in on a certain port to accept remote connections, or simple file manipulations such as adding entries to the target device's password file. However, these other shellcodes also require certain basic functions, such as mov, push, pop, and calls to system services, to accomplish their goals. As they exhibit the same basic functionality, the invention also encompasses detection of chroot or other types of shellcode.

Figure 4A:
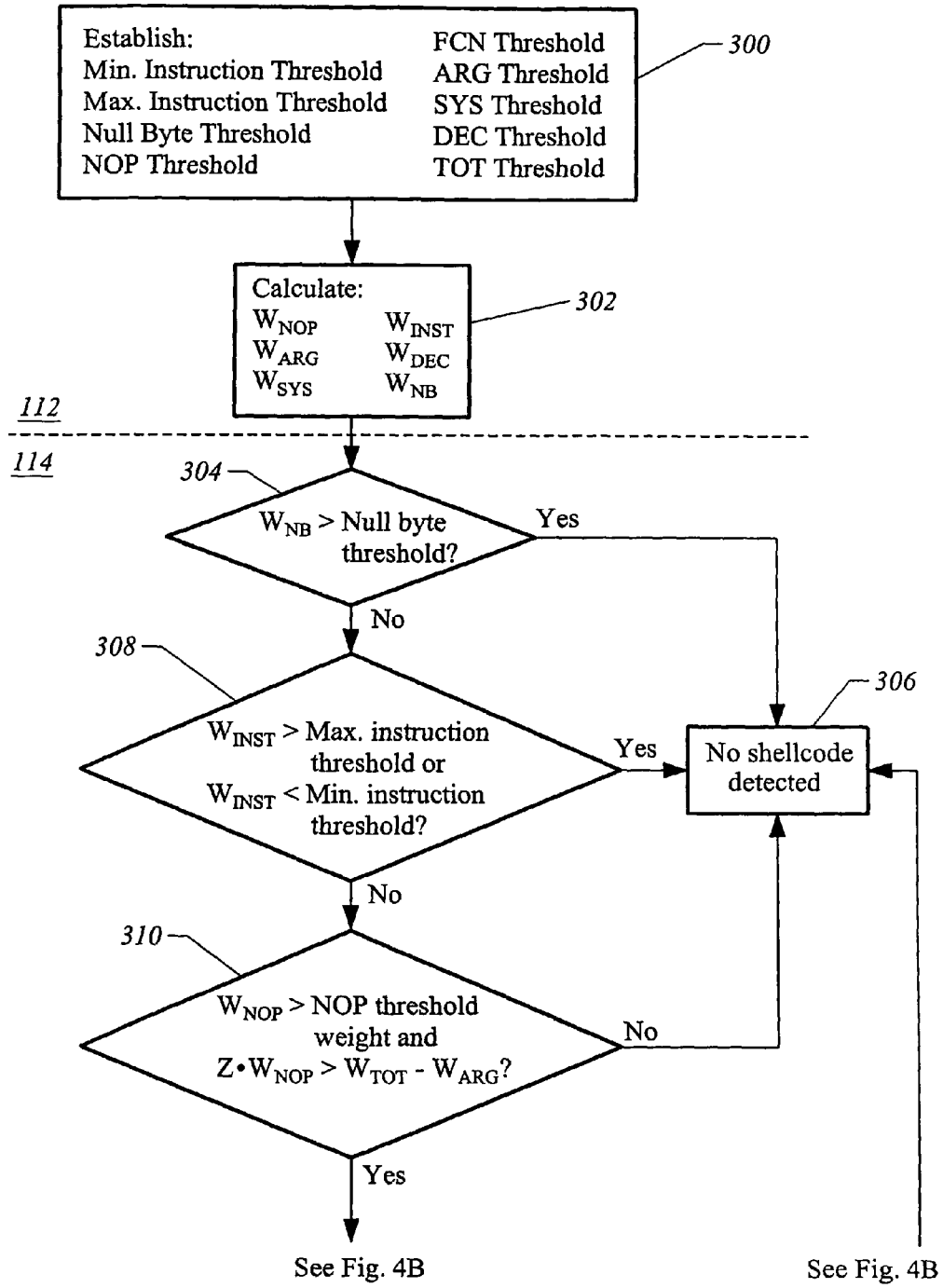
FIG. 4 illustrates processing steps performed in accordance with an embodiment of the present invention.
Figure 4B:
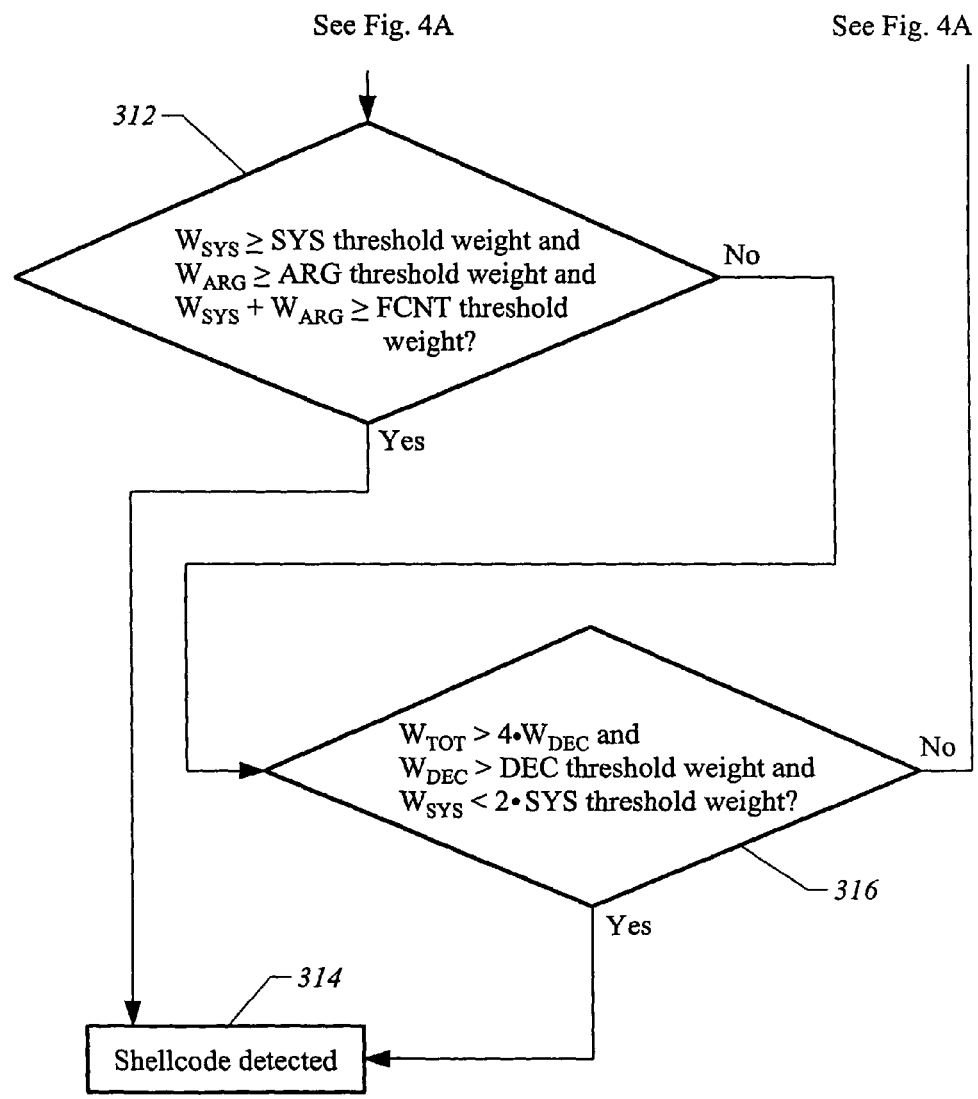

It is clear from the above description that shellcodes exhibit certain telltale characteristics, which can be used in their detection. FIG. 4 illustrates further processing steps in accordance with one embodiment of the invention, where these characteristics are utilized in calculating and evaluating various weight values so as to detect shellcode. The processing steps of FIG. 4 illustrate steps 112 and 114 of FIG. 2 in greater detail.

Step 112 encompasses the steps of establishing threshold values for various shellcode characteristics (step 300), and calculating weight values based on these characteristics (step 302). The first two thresholds established by step 300 are a minimum instruction threshold and a maximum instruction threshold. These values express, respectively, the minimum number of instructions a typical shellcode must contain to be viable, and the maximum number of instructions a shellcode typically can contain, based on constraints such as minimum instruction lengths. If an input string has fewer instructions than this minimum number, or more than the maximum number, it is deemed not to be a shellcode. In one embodiment, the minimum instruction threshold is empirically chosen as a small number, such as 5, while the maximum instruction threshold is also empirically chosen as a fraction of buffer length. For instance, the maximum instruction threshold can be chosen as ⅞ of the string length. However, the invention is not limited to these embodiments, and should be construed to include thresholds chosen in any known manner and for any platform.

A null byte threshold is also established, reflecting the number of times the null byte "\0" appears in the input string. Because copy commands such as strcpy copy text until they encounter a null byte, the presence of such a byte within a buffer 200 indicates the end of one string and the beginning of another. The presence of excessive null bytes thus indicates a number of small input strings, rather than a few large ones. Since shellcodes require instructions, arguments and the like, they tend to be longer than other input strings. Excessive null bytes thus point toward the conclusion that the input string is not a shellcode. Empirically, it has been found that a null byte threshold value of 2 is an effective metric for determining the existence of shellcode.

As above, the existence of a large number of NOPs or similar instructions tends to imply the existence of shellcode. A NOP threshold is thus also established corresponding to the number of NOPs present in the input string. Likewise, the above explanation shows that typical shellcodes contain at least a certain number of system call instructions for calling library commands, and a number of arguments, or information such as pointers and addresses that are required by these functions. Thus, SYS and ARG thresholds are established reflecting the number of system call instructions and arguments, respectively, contained in the input string.

In addition, since decoders also contain certain characteristics, a DEC threshold is established. As decoders can take on many forms, the invention encompasses a DEC threshold that can be calculated in many different ways. For example, the DEC threshold can be set proportional to the number of data manipulation instructions such as push, pop, mov, and the like. Alternately, it can be formulated to take the existence of jump and call instructions, another decoder characteristic, into account. Finally, a TOT threshold is established relating to the total number of characteristic instructions contained in a shellcode. The TOT threshold, then, is typically based on the sum of the NOP, ARG, SYS, and DEC thresholds.

A final threshold value has also been deemed effective. It has already been established that available shellcode should contain at least a minimum number of system calls (as measured against the SYS threshold), having at least a minimum number of arguments (as measured against the ARG threshold). It follows that a function call, or FCN, threshold measuring the sum of such system calls together with their arguments is also effective in determining the presence of shellcode. It is expected, then, that the FCN threshold be equal to or greater than the sum of the SYS and ARG thresholds.

Once these threshold values are established, the process moves to step 302 where weight values are calculated to reflect the number of input string instructions that fall into each of these categories. While these weight values can be calculated in any manner while remaining within the scope of the invention, a preferred embodiment parses input strings for instruction sequences contained in the pattern tables 22, and calculates corresponding weight values according to the expression:

$$W_i = \sum_{j=1}^{n} P_{op_j} K_{i_j}$$

where
$W_i$=weight value of NOP, ARG, SYS, DEC, and TOT instructions in a given input string,
n=total number of instruction sequences matched to the pattern tables 22,
$P_{op}$=strength constant describing the probability that this pattern indicates a real machine operation, and
$K_i$=NOP; ARG, SYS, DEC, and TOT weight factor.

Thus, in this embodiment, the pattern tables 22 contain a number of instruction sequences that tend to indicate the presence of a shellcode. These instruction sequences are each assigned a constant $P_{op}$ corresponding to the strength with which the occurrence of this particular pattern suggests that the string is a shellcode. The instruction sequences are also assigned weight factors $K_{NOP}$, $K_{ARG}$, $K_{SYS}$, $K_{DEC}$, and $K_{TOT}$ indicating the likelihood that this pattern is a NOP, argument, system call, or decoder. An input string is then checked for the presence of any of these patterns and for each match found, the corresponding operation code and appropriate weight factor are multiplied together and added to the correct weight value. The corresponding weight values $W_{NOP}$, $W_{ARG}$, $W_{SYS}$, $W_{DEC}$, and $W_{TOT}$ thus reflect the number of matching patterns in each category, weighted by the likelihood that each of these patterns represents an instruction from that category, and by the strength with which each pattern implies a shellcode.

For each instruction, the individual constants $P_{op}$ and $K_i$ can be determined in any number of ways, all of which are consistent with the invention. In one embodiment, the constants are determined empirically, by examining a number of known shellcodes and determining the frequency with which certain instructions and arguments appear. For each of these instructions, values can then be assigned to each constant in the appropriate proportion. In another embodiment, each constant is assigned a value according to the formula $K_i = A*B$. Here, A can be assigned varying values depending on the frequency with which the particular instruction appears in a particular context, and B can be assigned values depending on the frequency with which this instruction does not occur in other contexts. For example, in calculating $K_{SYS}$, A can be assigned a value of 0.25 if the instruction seldom occurs as part of a system call, 0.50 if it occurs seldom but has no equivalent instruction which can be substituted, 0.75 if it occurs often as part of a system call, and 1.00 if it occurs often and has no equivalent instruction. Likewise, B can be assigned values of 0.25 if the instruction often occurs in other contexts besides a system call, and 0.75 if it seldom occurs in other contexts. In this example, A would have a high value if the instruction often appears as part of a system call (particularly if it must occur as part of a system call), while B would have a high value if the instruction rarely occurs in other contexts besides shellcodes. A high value of $K_i$ thus indicates that the particular instruction occurs often in a particular shellcode context such as system calls, and rarely appears anywhere else besides system calls. As such, $K_i$ would be a strong indicator of a shellcode. A similar method can be used to calculate values of $P_{op}$. Additionally, one of skill in the art will appreciate that many other methods of calculating these constants exist, all of which are included in the present invention.

Not included in this embodiment is a weight value corresponding to the number of null bytes found. While it is often sufficient to simply keep a counter of the number of null bytes, alternate embodiments may wish to calculate a null byte weight value $W_{NB}$ instead, which may be determined in the same fashion as the other weight values described above. Likewise, the number of instructions is typically kept track of by a counter, yet can also be assessed according to a similarly-calculated weight value $W_{INST}$. In addition, it should be emphasized that the invention should not be construed as limited to the calculation of weight values in the above manner. Rather, the invention simply discloses the detection of shellcode based upon the number and types of instructions contained therein, and as such includes the calculation of weight values, or any other quantities for the detection of shellcode, by any means.

Once the weight values $W_i$ are calculated, they are compared to the thresholds established in step 300. First, the number of null bytes (or $W_{NB}$, depending on the specific embodiment) is compared to the null byte threshold (step 304). If this number exceeds the threshold, indicating many short strings and hence a low probability that shellcode is present, the process concludes that no shellcode exists (step 306) and terminates. If, however, the number does not exceed this threshold, a shellcode may still exist. The process then checks the number of instructions present. As above, even a minimally functional shellcode must possess at least some number of instructions, while excessive instructions tend to indicate that the input string is something else besides a shellcode. The number of instructions (or $W_{INS}$, depending on the embodiment) is then compared to the maximum and minimum instruction thresholds (step 308). If the number of instructions exceeds the maximum instruction threshold or falls below the minimum instruction threshold, no shellcode is deemed to exist and the process skips to step 306. However, if neither of these conditions is met, a shellcode may still be present.

The process next examines the number of NOPs or similar operations found in the input string (step 310). Here, it is advantageous to compare the NOP weight value $W_{NOP}$ to both a threshold weight and to the number of instructions. From the above, shellcodes typically contain a large number of NOPs to make calculation of the return address 212 easy. Thus, one characteristic of most shellcodes is that they have both a large number of NOPs and a large number of NOPs relative to the number of instructions present. Numerically then, if $W_{NOP}$ exceeds the NOP threshold weight and $Z*W_{NOP}$ exceeds $W_{TOT}-W_{ARG}$ (a quantity proportional to the number of instructions, as the contribution from any arguments is removed), the input string may be a shellcode. If either of these two conditions is not met though, the input string is likely not a shellcode and the process jumps to step 306. Note that the constant Z is simply an empirically chosen constant chosen such that the number of false alarms is minimized. In practice, a value of 2-3 has been found to be effective.

The process next examines the number of system calls found (step 312). Shellcodes require a certain number of system calls to carry out their intended functions, and each system call in turn requires a number of arguments, or pieces of data, to carry out its task. This implies a number of conditions. First, $W_{SYS}$ should equal or exceed the system call threshold weight. Second, as each system call requires multiple arguments, $W_{ARG}$ should equal or exceed the argument threshold weight. Third, as above, the sum of the two weight values $W_{SYS}$ and $W_{ARG}$ should equal or exceed the FCN threshold. Observe also that setting the FCN threshold at a value greater than the sum of the SYS and ARG thresholds thus serves to reduce the likelihood of false alarms by screening out strings that contain a minimum number of instructions corresponding to system calls and arguments, yet are not shellcodes.

The presence of few system calls implies either that no shellcode exists or that the shellcode is encoded, with its system calls effectively hidden. The process therefore also checks for the presence of a decoder (step 316). For a decoder to be deemed present, three conditions must be met. First, $W_{DEC}$ must exceed the DEC threshold weight. Second, as one purpose of a decoder is to prevent the use of system calls, $W_{SYS}$ must be less than 2 times the system call threshold weight. Third, as some instructions are utilized by both conventional shellcodes and those with decoders (examples being the push and mov instructions), and because even decoders require a certain minimum number of instructions to be effective, $W_{TOT}$ must exceed 4 times $W_{DEC}$. Similar to the Z constant above, the values 2 and 4 are chosen empirically yet have been found to be effective. If all three of these conditions are met, it is likely that an encoded shellcode exists, and the process moves to step 314. If not, then no shellcode, encoded or otherwise, exists and the process skips to step 306.

Figure 5:
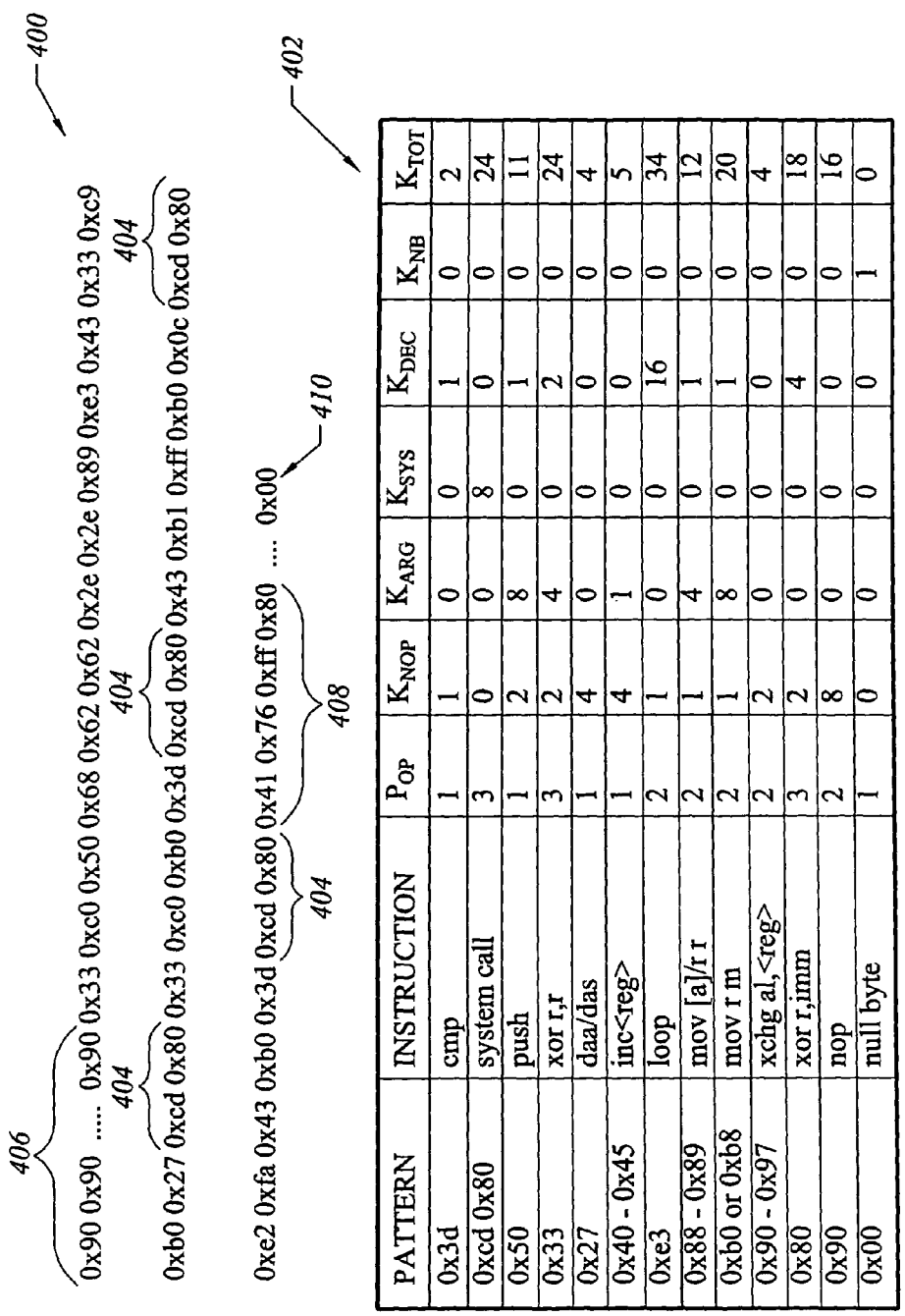
FIG. 5 illustrates an example shellcode analyzed in accordance with an embodiment of the present invention.

The processing steps of FIG. 4 are more easily explained with reference to the following examples. FIG. 5 illustrates a portion of a potential shellcode 400 to be evaluated according to one embodiment of the invention. The potential shellcode 400 is a string of hexadecimal characters as they would appear in a buffer. The various steps of an embodiment of the invention are now implemented to determine whether these characters comprise shellcode instructions. Thresholds are first established as follows:

Min. instruction threshold=128
Max. instruction threshold=2048
Null byte threshold=2
NOP threshold=512
ARG threshold=128
SYS threshold=48
DEC threshold=96
TOT threshold=10240
FCN threshold=256
Z=2

Furthermore, the table 402 illustrating instruction patterns and their associated constants has already been filled out in accordance with step 302 above. Note that the various constants in table 402 reflect the relative importance of each instruction to shellcodes overall, as well as to each instruction category. For example, it is apparent from the above discussion that the system call instruction set is an important element of almost all shellcodes, as is the xor instruction. More specifically, the system call instruction is a strong indicator within the SYS category, but does not signify much outside of it. Hence, the system call has a high $K_{SYS}$ value of 8, but small or 0 values otherwise. Likewise, the push instruction is critical to argument manipulation but only marginally useful in decoder functions. It thus has a $K_{ARG}$ value of 8, but a $K_{DEC}$ value of only 1. In contrast, the "cmp" instruction acts to compare two arguments, a function sometimes used to set predicate registers to true or false. As this instruction is used in limited contexts within shellcodes, and can appear in conventional input strings as well, the existence of a cmp instruction is given little weight. This is also true for the push instruction.

The various weight values must now be calculated by matching instructions in the potential shellcode 400 to patterns in table 402. For example, it can be seen that the system call instruction set 404 appears four times. A NOP field 406 also contains 512 NOP instructions, although for the sake of simplicity only 3 are shown. Similarly, the return address field 408 is repeated 123 times, although only shown here once. The string ends with a null byte 410.

According to the equation provided earlier, matching these and other instructions to the table 402 yields weight values of:
$W_{INS}$=1041
$W_{NOP}$=10766
$W_{ARG}$=608
$W_{SYS}$=96
$W_{DEC}$=75
$W_{NB}$=1
$W_{TOT}$=21924

These weight values are now compared to the previously defined thresholds to determine whether a shellcode exists. According to the steps of FIG. 4, the null byte weight value is first compared to the null byte threshold. Since the null byte weight value (1) is less than the null byte threshold (2), the process moves on to step 308. Here, neither condition is satisfied, as 1041<2048 and 1041>128, indicating that the shellcode 400 has more than enough instructions to function as a shellcode, yet not so many that it is unlikely to be one.

Next, the number of NOP instructions is examined. As 10766>512 and 2*10766>(21924−608), the potential shellcode 400 contains sufficient NOPs to raise the suspicion of a shellcode, as well as a large number of NOPs relative to the number of instructions present. Finally, the number of system calls is analyzed. A sufficient number of system calls exists for a functioning shellcode to be present, as 96>48, 608>128, and 96+608>256. As the string 400 thus meets all the criteria of steps 304-312, it is deemed a shellcode.

Figure 6:
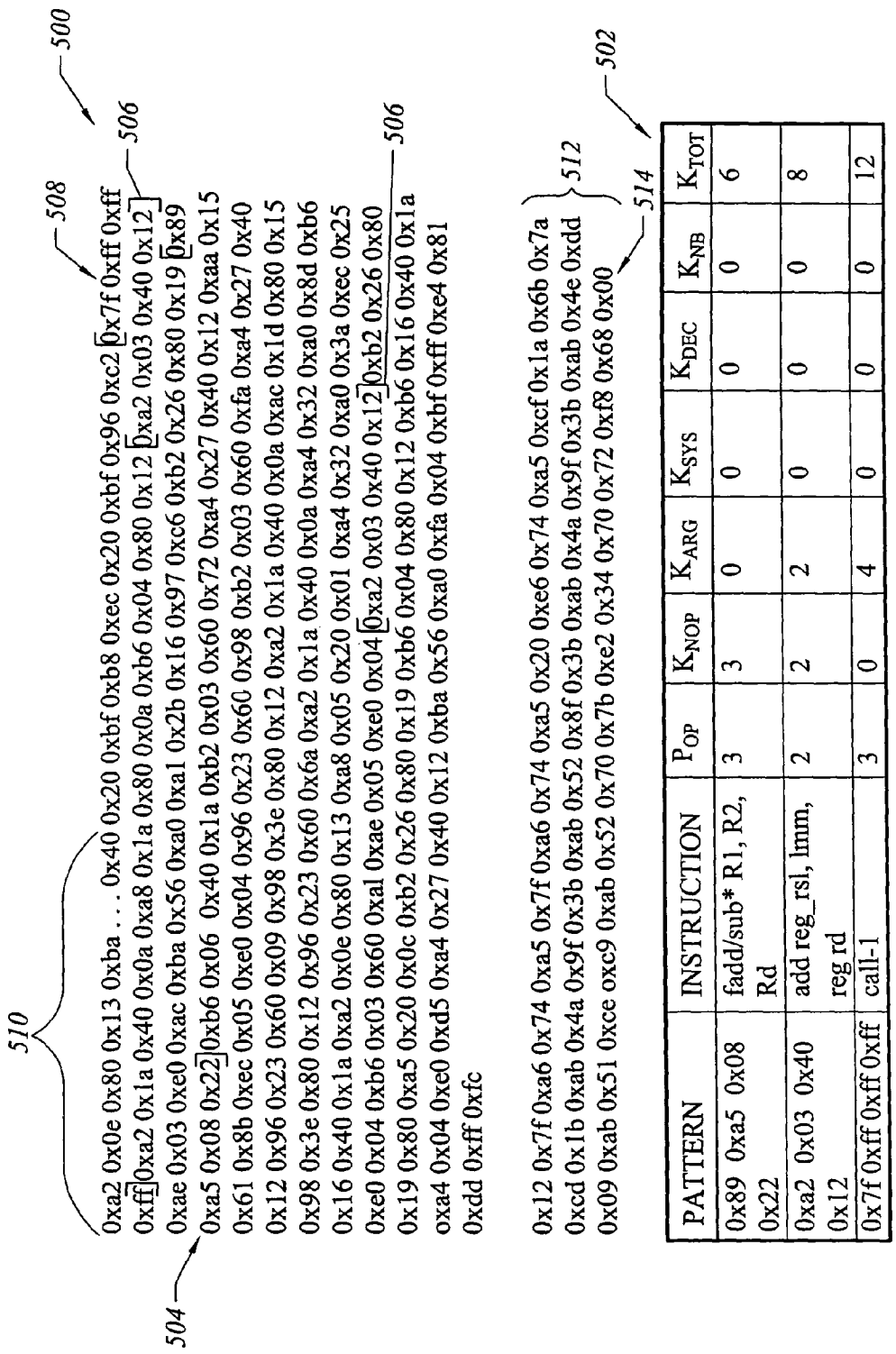
FIG. 6 illustrates an example shellcode analyzed in accordance with an embodiment of the present invention.

FIG. 6 illustrates a portion of another possible shellcode 500. The table 502, which can simply be an extension of table 402, contains patterns corresponding to various instruction sequences used by many common decoders. As above, these patterns are matched against the string 500, and weight values are calculated accordingly. Here, the add/subtract operation sequence 504 appears once, the add register sequence 506 appears twice, and the call instruction sequence 508 appears once. Additionally, a NOP field 510 containing 455 NOPs, an address field 512 containing 357 addresses, and a null byte 514 are shown. From these patterns, the values of the various weights are:
$W_{INS}$=1020
$W_{NOP}$=17
$W_{ARG}$=20
$W_{SYS}$=0
$W_{DEC}$=0
$W_{NB}$=1
$W_{TOT}$=86

These weight values are then compared to the thresholds above to determine whether a shellcode exists. As with the previous shellcode 400, only one null byte 510 exists, so the null byte threshold is not exceeded. Also, the potential shellcode 500 contains a number of instructions within the range of possible shellcodes, as 1020<2048 but 1020>128. However, insufficient NOPs exist for this to be considered a shellcode, as 17<512. This sequence 508 is thus deemed not to be a shellcode.

The foregoing descriptions of specific embodiments of the present invention are presented for purposes of illustration and description. They are not intended to be exhaustive or to limit the invention to the precise forms disclosed. Obviously, many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A computer-implemented method, comprising:
   scanning a set of computer instructions for a null operation instruction; and
   detecting predetermined code based at least in part on the null operation instruction;
   wherein the predetermined code is detected based at least in part on a decoder instruction set including a jump instruction for acting as an encoded system call instruction, the jump instruction invoking a function in an absence of a system call instruction from the set of computer instructions.

2. The method of claim 1, wherein the predetermined code is detected based at least in part on another system call instruction.

3. A computer-implemented method, comprising:
   scanning a set of computer instructions for a null operation instruction;
   reviewing the set of computer instructions for the presence of a decoder instruction set including a jump instruction for acting as an encoded system call instruction, the jump instruction invoking a function in the absence of a system call instruction from the set of computer instructions; and
   detecting predetermined code based at least in part on the null operation instruction;
   wherein the predetermined code includes shellcode.

4. A computer-implemented method, comprising:
   scanning a set of computer instructions for a system call instruction; and
   detecting predetermined code based at least in part on the system call instruction;
   wherein the predetermined code is detected based at least in part on a decoder instruction set including a jump instruction for acting as an encoded system call instruction, the jump instruction invoking a function in an absence of the system call instruction from the set of computer instructions.

5. The method of claim 4, wherein the predetermined code is detected based at least in part on a null operation instruction.

6. A computer-implemented method, comprising:
   scanning a set of computer instructions for a system call instruction;
   reviewing the set of computer instructions for the presence of a decoder instruction set including a jump instruction for acting as an encoded system call instruction, the jump instruction invoking a function in the absence of the system call instruction from the set of computer instructions; and
   detecting predetermined code based at least in part on the system call instruction;
   wherein the predetermined code includes shellcode.

7. A computer program product embodied on a non-transitory computer readable medium, comprising:
   computer code for scanning a set of computer instructions for a decoder instruction set; and
   computer code for detecting predetermined code based at least in part on the decoder instruction set including a jump instruction for acting as an encoded system call instruction, the jump instruction invoking a function in an absence of a system call instruction from the set of computer instructions.

8. The computer program product of claim 7, wherein the predetermined code is detected based at least in part on another system call instruction.

9. The computer program product of claim 7, wherein the predetermined code is detected based at least in part on a null operation instruction.

10. The computer program product of claim 7, wherein the predetermined code includes shellcode.

11. A method of detecting a shellcode, comprising:
scanning a set of computer instructions for at least one of a null operation instruction, a system call instruction, and a decoder instruction set; and
detecting a shellcode based at least in part on at least one of the null operation instruction, the system call instruction, and the decoder instruction set;
wherein the decoder instruction set includes a jump instruction for acting as an encoded system call instruction, the jump instruction invoking a function in an absence of the system call instruction from the set of computer instructions.

12. A computer program product embodied on a non-transitory computer readable medium, comprising:
computer code for scanning a set of computer instructions for a null operation instruction; and
computer code for detecting predetermined code based at least in part on the null operation instruction;
wherein the computer program product is operable such that the predetermined code is detected based at least in part on a decoder instruction set including a jump instruction for acting as an encoded system call instruction, the jump instruction invoking a function in an absence of a system call instruction from the set of computer instructions.

13. A system, comprising:
a processor for:
scanning a set of computer instructions for a null operation instruction; and
detecting predetermined code based at least in part on the null operation instruction;
wherein the system is operable such that the predetermined code is detected based at least in part on a decoder instruction set including a jump instruction for acting as an encoded system call instruction, the jump instruction invoking a function in an absence of a system call instruction from the set of computer instructions.

14. A computer program product embodied on a non-transitory computer readable medium, comprising:
computer code for scanning a set of computer instructions for a null operation instruction;
computer code for reviewing the set of computer instructions for the presence of a decoder instruction set including a jump instruction for acting as an encoded system call instruction, the jump instruction invoking a function in the absence of a system call instruction from the set of computer instructions; and
computer code for detecting predetermined code based at least in part on the null operation instruction;
wherein the predetermined code includes shellcode.

15. A system, comprising:
a processor for:
scanning a set of computer instructions for a null operation instruction;
reviewing the set of computer instructions for the presence of a decoder instruction set including a jump instruction for acting as an encoded system call instruction, the jump instruction invoking a function in the absence of a system call instruction from the set of computer instructions; and
detecting predetermined code based at least in part on the null operation instruction;
wherein the predetermined code includes shellcode.

16. A computer program product embodied on a non-transitory computer readable medium, comprising:
computer code for scanning a set of computer instructions for a system call instruction; and
computer code for detecting predetermined code based at least in part on the system call instruction;
wherein the computer program product is operable such that the predetermined code is detected based at least in part on a decoder instruction set including a jump instruction for acting as an encoded system call instruction, the jump instruction invoking a function in an absence of the system call instruction from the set of computer instructions.

17. A system, comprising:
a processor for:
scanning a set of computer instructions for a system call instruction; and
detecting predetermined code based at least in part on the system call instruction;
wherein the system is operable such that the predetermined code is detected based at least in part on a decoder instruction set including a jump instruction for acting as an encoded system call instruction, the jump instruction invoking a function in an absence of the system call instruction from the set of computer instructions.

18. A computer program product embodied on a non-transitory computer readable medium, comprising:
computer code for scanning a set of computer instructions for a system call instruction;
computer code for reviewing the set of computer instructions for the presence of a decoder instruction set including a jump instruction for acting as an encoded system call instruction, the jump instruction invoking a function in the absence of the system call instruction from the set of computer instructions; and
computer code for detecting predetermined code based at least in part on the system call instruction;
wherein the predetermined code includes shellcode.

19. A system, comprising:
a processor for:
scanning a set of computer instructions for a system call instruction;
reviewing the set of computer instructions for the presence of a decoder instruction set including a jump instruction for acting as an encoded system call instruction, the jump instruction invoking a function in the absence of the system call instruction from the set of computer instructions; and
detecting predetermined code based at least in part on the system call instruction;
wherein the predetermined code includes shellcode.

20. A method, comprising:
scanning a set of computer instructions for a decoder instruction set; and
detecting predetermined code based at least in part on the decoder instruction set including a jump instruction for acting as an encoded system call instruction, the jump instruction invoking a function in an absence of a system call instruction from the set of computer instructions.

21. A system, comprising:
a processor for:
  scanning a set of computer instructions for a decoder instruction set; and
  detecting predetermined code based at least in part on the decoder instruction set including a jump instruction for acting as an encoded system call instruction, the jump instruction invoking a function in an absence of a system call instruction from the set of computer instructions.

22. A computer program product embodied on a non-transitory computer readable medium, comprising:
  computer code for scanning a set of computer instructions for at least one of a null operation instruction, a system call instruction, and a decoder instruction set; and
  computer code for detecting a shellcode based at least in part on at least one of the null operation instruction, the system call instruction, and the decoder instruction set;
  wherein the decoder instruction set includes a jump instruction for acting as an encoded system call instruction, the jump instruction invoking a function in an absence of the system call instruction from the set of computer instructions.

23. A system, comprising:
a processor for:
  scanning a set of computer instructions for at least one of a null operation instruction, a system call instruction, and a decoder instruction set; and
  detecting a shellcode based at least in part on at least one of the null operation instruction, the system call instruction, and the decoder instruction set;
  wherein the decoder instruction set includes a jump instruction for acting as an encoded system call instruction, the jump instruction invoking a function in an absence of the system call instruction from the set of computer instructions.

24. The method of claim 1, further comprising establishing a null operation instruction threshold that reflects a number of times the null operation instruction occurs in an input string.

25. The method of claim 3, further comprising establishing threshold values for characteristics of the shellcode, and calculating weight values based on the characteristics including a minimum instruction threshold and a maximum instruction threshold.

\* \* \* \* \*